(12) United States Patent
Yan et al.

(10) Patent No.: US 10,332,010 B2
(45) Date of Patent: Jun. 25, 2019

(54) SYSTEM AND METHOD FOR AUTOMATICALLY SUGGESTING RULES FOR DATA STORED IN A TABLE

(71) Applicants: Nancy Yan, Cupertino, CA (US); Min He, San Jose, CA (US); David Kung, Cupertino, CA (US)

(72) Inventors: Nancy Yan, Cupertino, CA (US); Min He, San Jose, CA (US); David Kung, Cupertino, CA (US)

(73) Assignee: Business Objects Software Ltd., Dublin (IE)

( * ) Notice: Subject to any disclaimer, the term of this patent is extended or adjusted under 35 U.S.C. 154(b) by 239 days.

(21) Appl. No.: 13/770,666

(22) Filed: Feb. 19, 2013

(65) Prior Publication Data
US 2014/0236880 A1    Aug. 21, 2014

(51) Int. Cl.
| | | |
|---|---|---|
| *G06N 7/02* | (2006.01) | |
| *G06N 7/04* | (2006.01) | |
| *G06N 7/06* | (2006.01) | |
| *G06N 7/08* | (2006.01) | |
| *G06N 5/02* | (2006.01) | |

(52) U.S. Cl.
CPC .................................. *G06N 5/025* (2013.01)

(58) Field of Classification Search
None
See application file for complete search history.

(56) References Cited

U.S. PATENT DOCUMENTS

| | | | |
|---|---|---|---|
| 6,636,861 B1 | 10/2003 | Stack | |
| 7,756,873 B2 | 7/2010 | Gould et al. | |
| 7,805,462 B2 | 9/2010 | Dupont et al. | |
| 8,078,643 B2 | 12/2011 | Mush et al. | |
| 8,666,919 B2 | 3/2014 | Miranda et al. | |
| 8,671,119 B2* | 3/2014 | Tulkoff | G06F 17/303 707/803 |
| 8,719,271 B2 | 5/2014 | Nelke et al. | |
| 8,805,769 B2 | 8/2014 | Ritter et al. | |
| 8,949,166 B2* | 2/2015 | Nelke | G06N 5/025 706/47 |
| 2004/0083199 A1* | 4/2004 | Govindugari | G06F 17/30303 |
| 2004/0133551 A1* | 7/2004 | Linstedt | 707/1 |
| 2004/0143588 A1* | 7/2004 | Russell | G11C 5/04 |
| 2005/0108631 A1 | 5/2005 | Amorin et al. | |
| 2005/0114369 A1 | 5/2005 | Gould et al. | |
| 2006/0212475 A1* | 9/2006 | Cheng | G06Q 10/10 |

(Continued)

*Primary Examiner* — Scott A. Waldron
*Assistant Examiner* — Ababacar Seck
(74) *Attorney, Agent, or Firm* — Schwegman Lundberg & Woessner, P.A.

(57) ABSTRACT

A method and system are presented of automatically suggesting rules for data stored in a table, with the table comprising a plurality of columns. The table is profiled to identify a content type for each of one or more of the plurality of columns. A rule knowledge base is accessed to locate rules specified for identified content types. Then, one or more of the located rules specified for identified content types are presented as suggestions. Acceptance of one or more of the suggested rules is received from a user, and the received validations are stored in the rule knowledge base. The accepted rules are applied to data for quality detection and monitoring. Embodiments are also described where columns are suggested based on a given rule.

23 Claims, 11 Drawing Sheets

(56) References Cited

U.S. PATENT DOCUMENTS

| | | | |
|---|---|---|---|
| 2007/0074155 A1 | 3/2007 | Ama et al. | |
| 2008/0140696 A1* | 6/2008 | Mathuria | G06F 17/30315 |
| 2009/0063372 A1 | 3/2009 | Lu et al. | |
| 2010/0205205 A1* | 8/2010 | Hamel | G06F 17/30286 |
| | | | 707/769 |
| 2010/0257136 A1* | 10/2010 | Velozo | G06F 17/30592 |
| | | | 707/602 |
| 2011/0178974 A1* | 7/2011 | Sayal | G06N 5/022 |
| | | | 706/50 |
| 2012/0066214 A1* | 3/2012 | Nelke | G06F 17/10 |
| | | | 707/723 |
| 2012/0101975 A1* | 4/2012 | Khosravy | G06Q 30/02 |
| | | | 706/55 |
| 2012/0158625 A1* | 6/2012 | Nelke | G06N 5/025 |
| | | | 706/12 |
| 2013/0054438 A1* | 2/2013 | Boding | G06Q 20/4016 |
| | | | 705/35 |
| 2013/0166515 A1 | 6/2013 | Kung et al. | |
| 2014/0081931 A1 | 3/2014 | Kung et al. | |
| 2014/0108238 A1 | 4/2014 | Boding | |
| 2014/0229456 A1* | 8/2014 | Hollifield | G06F 17/30371 |
| | | | 707/697 |
| 2015/0066987 A1* | 3/2015 | Nelke | G06F 17/30289 |
| | | | 707/781 |

\* cited by examiner

SYSTEM AND METHOD FOR AUTOMATICALLY SUGGESTING RULES FOR DATA STORED IN A TABLE

TECHNICAL FIELD

This document generally relates to systems and methods for use with enterprise resource planning. More specifically, this document relates to a system and method for intelligent rule validation suggestion in based on content type profiling.

BACKGROUND

Enterprise Information Management (EIM) is a particular field within IT. EIM tools and techniques are for designing, cataloguing, organizing, and securing data records (including content found in databases, transaction systems, data warehouses, documents, and media) and making them available to consumers subject to security. Tools and techniques create and maintain consistent interpretation of structured and unstructured data. Tools can include extract transform and load tool. These involve extracting data from data sources. Then transforming them as needed to change format, augment, improve data quality, and the like. The data is loaded into a target data source.

While the following description will describe various embodiments related to an ERP system, one of ordinary skill in the art will recognize that the claims should not be limited to merely ERP embodiments, as the solution described herein could apply to other systems such as Customer Relationship Management (CRM) systems, Supplier Relationship Management systems (SRM), and general databases.

Enterprise resource planning (ERP) systems allow for the integration of internal and external management information across an entire organization, including financial/accounting, manufacturing, sales and service, customer relationship management, and the like. The purpose of ERP is to facilitate the flow of information between business functions inside the organization and manage connections to outside entities. Data with ERP, however, may not always be valid. For example, for an employee record, there may be a number of fields, including social security number, address, and postal code. Through profiling, it may be discovered that some of these fields incomplete, inaccurate, incorrect, or invalid data, or at least are suspected to have incomplete, inaccurate, incorrect, or invalid data. In such cases, it is beneficial to clean up this bad data and prevent future records from having such bad values entered on them. Validation and cleansing rules can be used to do this, but currently validation and cleansing rules require a lot of manual effort.

A content type is a table "column" attribute which identifies the semantic or meaning of the data values stored in a column. Content Type identification uses core Data Cleanse parsing technology and Cleansing Packages (parsing dictionaries) along with some additional custom logic (e.g. field proximity) to identify the content of a field of data. It also uses context and metadata information along with the analysis of the data itself to be able to establish an understanding of the data.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to the skilled in the art, that embodiments of the inventive subject matter may be practiced without these specific details. In general, well-known instruction instances, protocols, structures, and techniques have not been shown in detail.

In an example embodiment, rules for data are automatically proposed through profiling. A system can be provided that examines enterprise data, discovers relationships between data objects and rules, and proposes rules based on these relationships.

Figure 1:
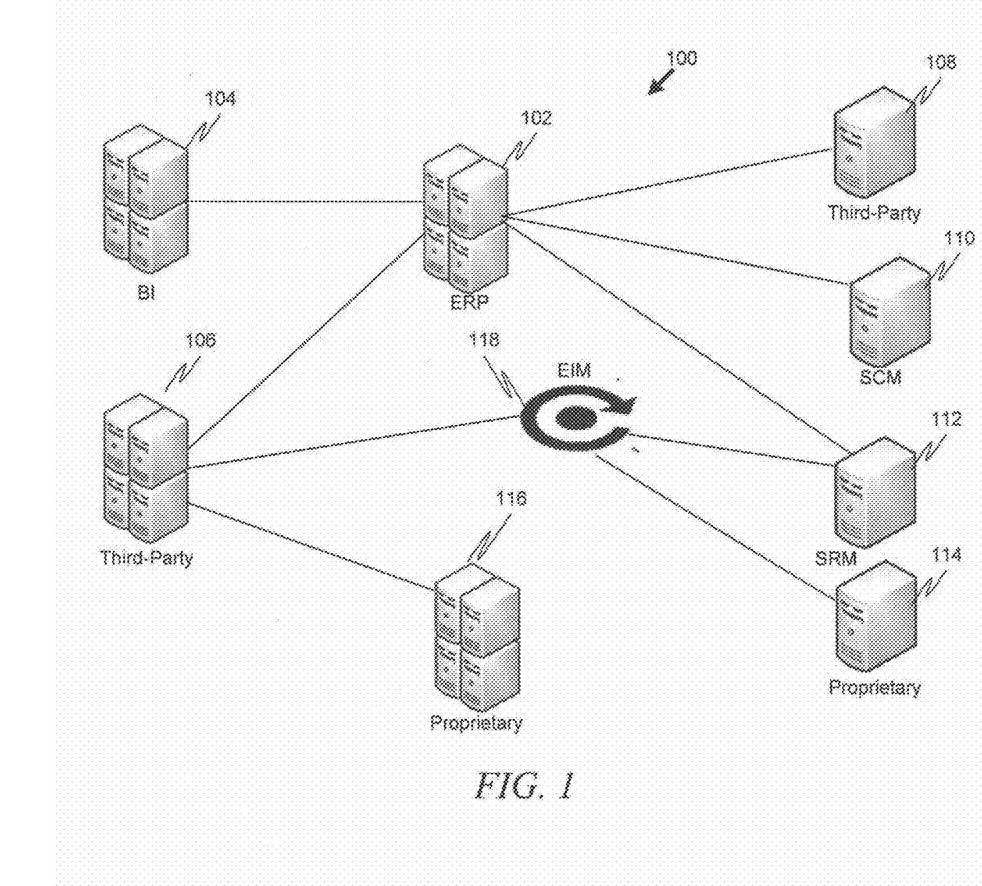
FIG. 1 depicts an application landscape, in accordance with an example embodiment.

FIG. 1 depicts an application landscape, in accordance with an example embodiment. The application landscape 100 comprises different heterogeneous software and/or hardware components 102 to 116, which are connected to each other as shown by the solid lines in FIG. 1, and which may operate together in the application landscape 100 to process, for example, a business scenario. The application landscape 100 may comprise an ERP system 102. The ERP 102 may integrate internal and external management information across an entire organization, embracing different activities and/or services of an enterprise. The ERP system 102 automates the activities and/or services with an integrated computer-based application. The ERP system 102 can run on a variety of hardware and/or network configurations, typically employing a database to store its data. The ERP system 102 may be associated with (e.g., directly or indirectly connected to and/or in (networked) communication with) a business intelligence (BI) component 104, one or more third parties 106 and 108, a supply chain management (SCM) component 110, and/or a SRM component 112. The SRM 112 and/or the SCM 110 may further be associated with at least one proprietary service 114. Furthermore, at least one of the third parties 106 may also be associated with at least one proprietary service 116. The BI component 104 may provide historical, current, and predictive views of business processes and/or business scenarios, for example, performed on the ERP 102. Common functionality of business intelligence technologies may comprise reporting, online analytical processing, analytics, data mining, business performance management, benchmarking, text mining, and/or predictive analytics. The functionality may be used to support better decision making in the ERP system 102. The SCM component 110 may manage a network of interconnected businesses involved in the provision of product and/or service packages used by end consumers such as the ERP system 102. The SCM component 110 may span movement and storage of raw materials, work-in-process inventory, and finished goods from point of origin to point of consumption (also referred to as a supply chain). The SRM component 112 may specify collaborations with suppliers that are vital to the success of the ERP system 102 (e.g., to maximize the potential value of those relationships). All of these systems may be integrated via an Enterprise Information Management (EIM) component 118. In an example embodiment, the EIM component 118 may contain processes for performing automatic rule suggestion based on content types, as will be described later.

Figure 2:
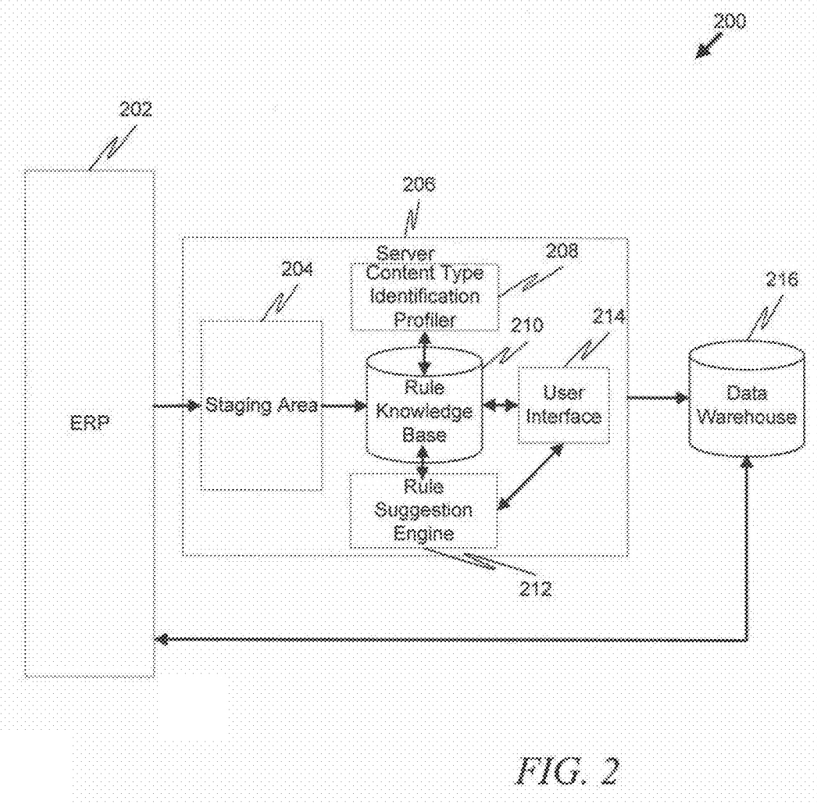
FIG. 2 is a diagram illustrating a system capable of automatic rule generation, in accordance with another example embodiment.

FIG. 2 is a diagram illustrating as system 200 capable of automatic rule generation, in accordance with another example embodiment. Here, data is extracted from a source system, such as an ERP system 202 and placed in a staging area 204 of a server 206. A content type identification profiler 208 then identifies content types within the data. In an example embodiment, this may include identifying a content type for each column of the data. The system then can refer to a rule knowledge base 210 containing a number of rules and mappings between rules and data content types. The system is able to correlate content types to rules and therefore indicate relevant rules available for given content types. The system is able to correlate table columns to rules and therefore indicate relevant rules available for given table columns. This may be performed by a rule suggestion engine 212. Rules may be suggested to the user via a user interface 214. The use can then accept or reject the proposed rule. As will be seen later, the acceptance or rejection of the proposed rules can then be saved in the rule knowledge base 210 and used to help make future rule suggestions by the rule suggestion engine 212.

The data itself can be stored in a target system, such as data warehouse 216. The ERP 202 can then also utilize the stored validation rules from the data warehouse 216 when receiving future data from data sources, using the rules to validate and possibly reject bad data (or even correct the incomplete, inaccurate, incorrect, or invalid data).

It should be noted that the suggested rules may be any type of rules. Examples include validation rules, which are used by a component to detect and monitor quality of incoming data (e.g., by filtering the data according to the rules) and cleansing rules, which are used by a component to fix data (e.g., by modifying the data according to the rules, either as it arrives or in storage).

Figure 3:
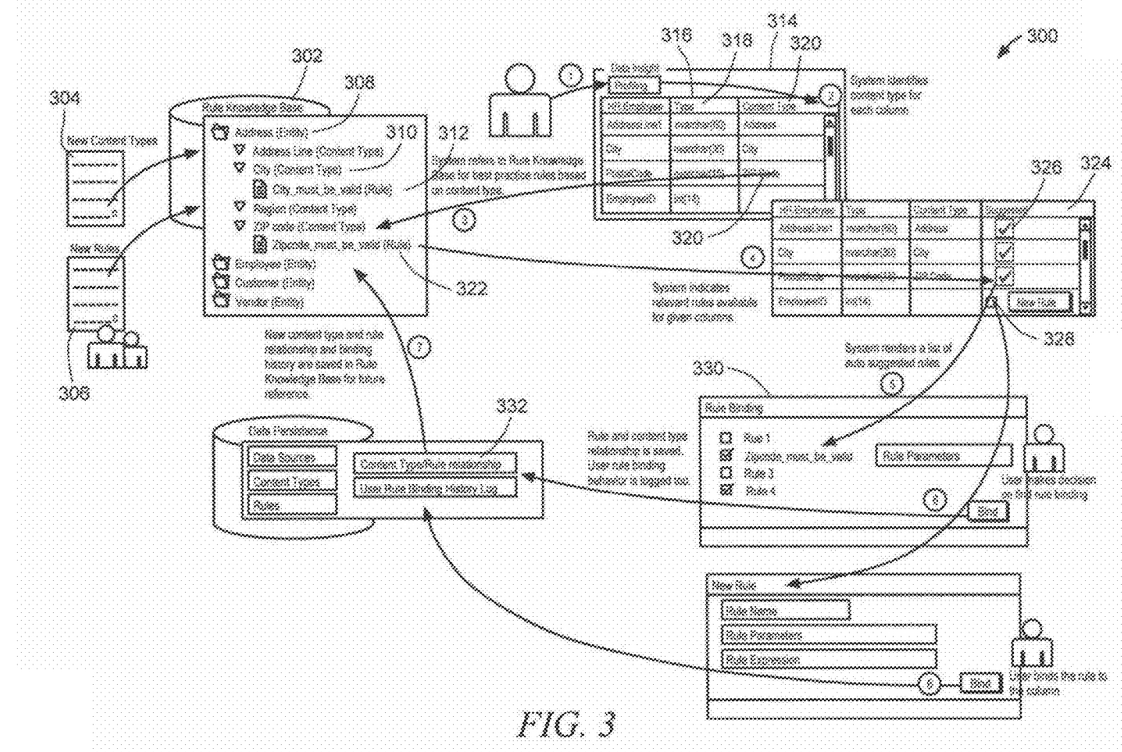
FIG. 3 is a diagram illustrating a system, in accordance with an example embodiment, depicting user interaction and system integration flow.

FIG. 3 is a diagram illustrating a system, in accordance with an example embodiment, of rule suggestion. The system 300 includes a rule knowledge base 302. New content types 304 and new rules 306 can be added to the knowledge base manually by users or automatically by the system. Content types and rules may be stored in the rule knowledge base 302 in entity data structures. Each entity 308 may contain one or more content types 310. Rules 312 may then be associated with content types 310. As can be seen, some content types may not have rules (or may not have rules assigned yet), while others do. The content type identification profiler 314 may take data and identify content types 310 for each column of the data. This may produce a column content type data structure 316. In this example, the column content type data structure 316 is a table including, for each column of the original data, an indication of the structure of the column's data (depicted as "type" 318 in this example), as well as an indication of a content type 320. In this example, four columns have been identified in an "HR.Employee" table, including AddressLine1, City, Postal Code, and EmployeeID. AddressLine1, for example, is of data type nvarchar with as length of 60. The system here has identified a content type "address" as correlating to this column of the HR.Employee table. It should be noted that the system may not be able to correlate content types for each and every column of the original table. In this example, EmployeeID, a data type being an integer of size 14, does not have a content type that the content type identification profiler can derive.

Once the content types for the data are identified, these content types may be used to identify relevant rules for the data. Here, for example, the content type "zip code" 320 is used to retrieve the rule "Zipcode_must_be_valid" 322, which is stored under the corresponding content type in the rule knowledge base 302. An indication 324 may then be provided to the user in a user interface, showing that a suggested rule exists for this column. Indeed, this indication 324 may indicate all of the columns of the data, as well as which columns have suggested rules for binding. A rule binding is an association between a rule and a column. If there are existing rules that can be applied to this column, an indicator 326 suggests a new rules and binds the new rule to the column. If there are no relevant rules applicable for this column, a button 328 suggests a new rule creation.

When one of the columns having a suggested rule is selected, a rule binding prompt 330 may be displayed to the user, allowing the user to bind the suggested rule, as well as add additional rules or modify rule parameters, allowing the user to bind the column to specific parameters of a rule. This binding decision may be stored in a user rule binding history log 332 as part of the rule knowledge base 302 for future use of auto rule suggestion.

Figure 4:
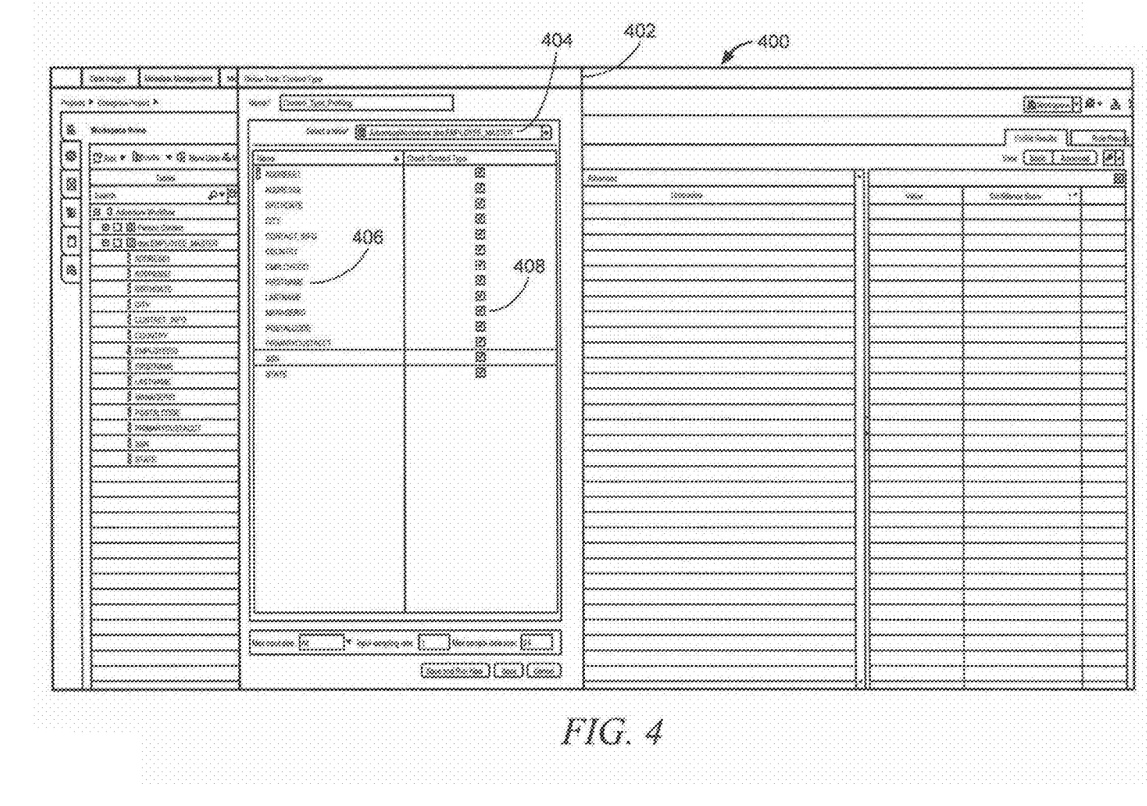
FIG. 4 is a screen capture illustrating a user interface, in accordance with an example embodiment, allowing a user to perform content type profiling.

FIG. 4 is a screen capture illustrating a user interface, in accordance with an example embodiment, allowing a user to perform content type profiling. Within the user interface 400, a content type definition window 402 allows a user to select a table 404 and then use check boxes 408 to select one or more columns 406 present in the table for content type profiling. It should be noted that this initial setting of the definition of a content type being performed by a user may be optional in some embodiments. Artificial intelligence can be used to initially define content types for particular tables rather than direct user intervention.

Figure 5:
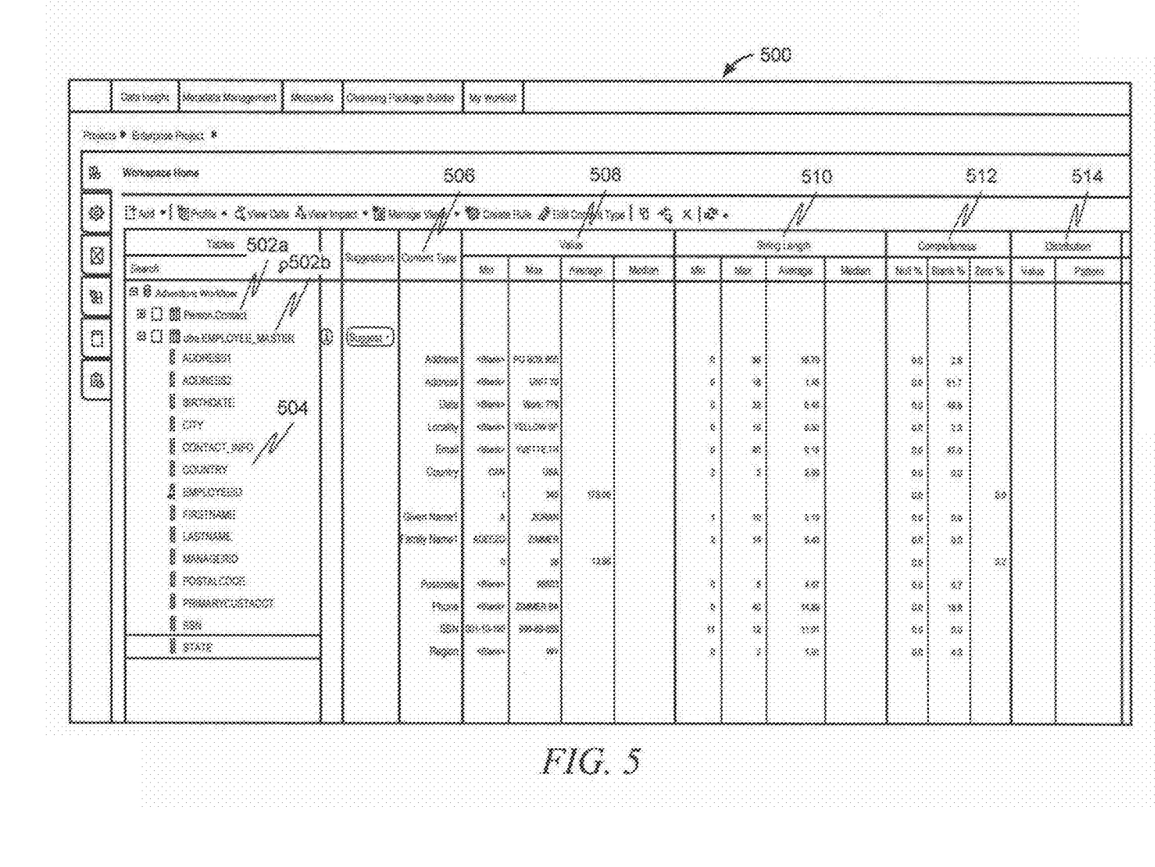
FIG. 5 is a screen capture illustrating another user interface, in accordance with an example embodiment, depicting content types identified in profiling results.

FIG. 5 is a screen capture illustrating another user interface, in accordance with an example embodiment, depicting content types identified in profiling results. Subsequent to the system performing profiling of incoming data tables, a workspace 500 may be presented to the user. This workspace may depict tables 502a, 502b in the incoming data. Within each table 502a, 502b, a listing of columns 504 may be presented. Based on content type profiling result, a content type 506 may be presented for as many columns 504 as possible. Additional information about each column may also be presented, including value statistics 508, such as minimum, maximum, average, and median values; string length statistics 510; completeness statistics 512; and distribution statistics 514. These statistics, 508, 510, 512, and 514, may be useful in the user's decision as to whether to create or bind a rule to the particular content type.

Figure 6:
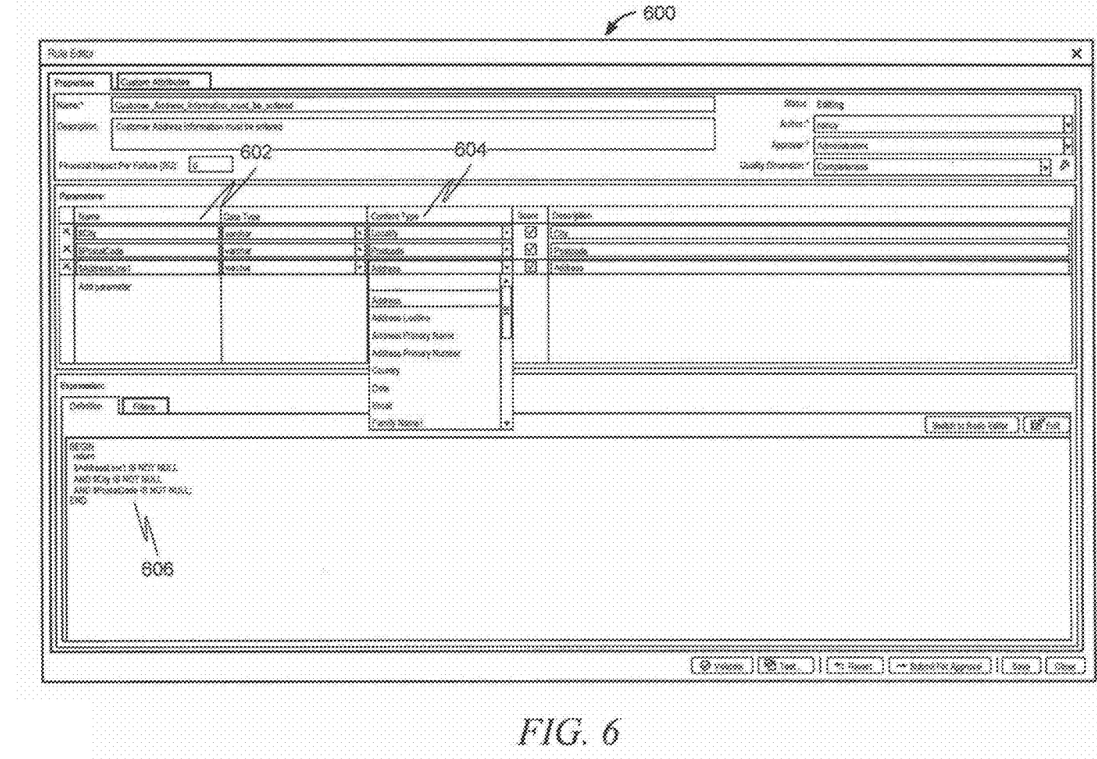
FIG. 6 is a screen capture illustrating another user interface, in accordance with an example embodiment, depicting the user creating a rule for content types.

FIG. 6 is a screen capture illustrating another user interface, in accordance with an example embodiment, depicting the user creating a rule far content types. A rule editor window 600 is presented that allows the user to define parameters for the rule, associate a content type 604 with the rule parameter 602. Also presented is an expression area 604, where the user can view the actual rule definition that involves the parameters. As can be seen, a single rule can be bound to a plurality of columns and/or content types.

Figure 7:
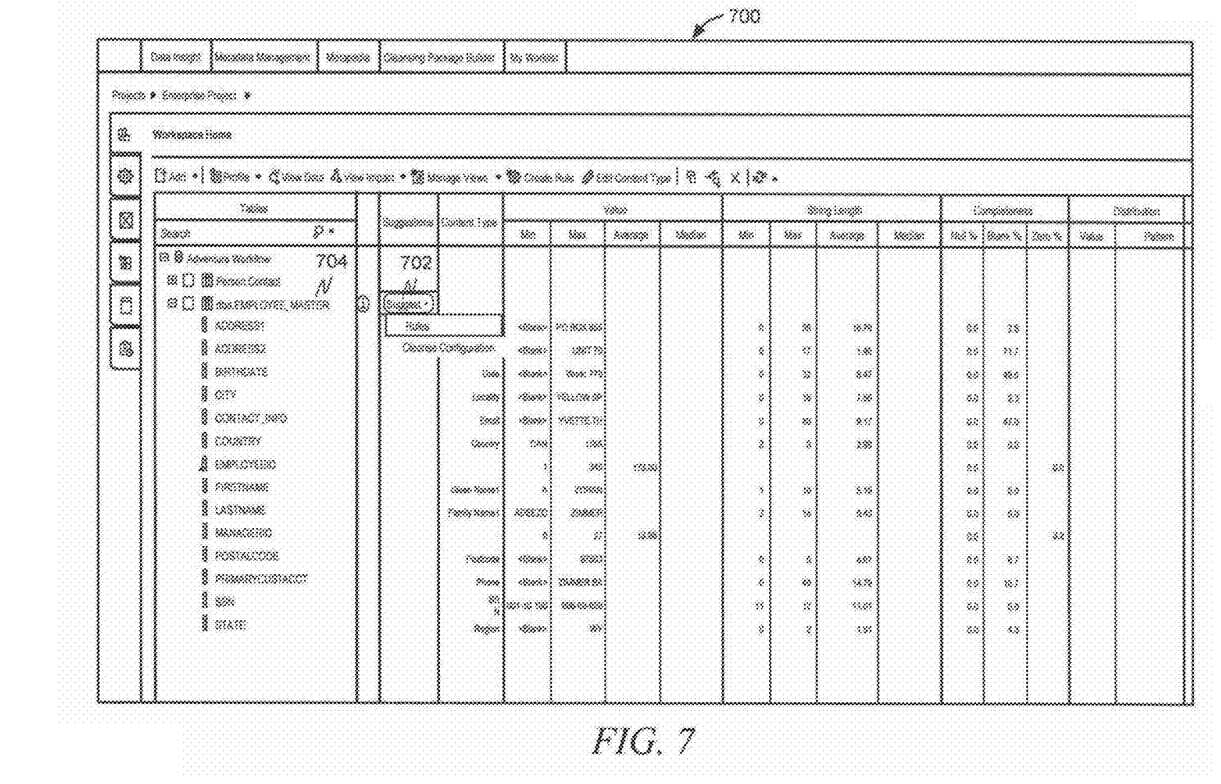
FIG. 7 is a screen capture illustrating another user interface, in accordance with an example embodiment, depicting suggestion of rules based on content types identified for the columns.

FIG. 7 is a screen capture illustrating another user interface, in accordance with an example embodiment, displaying suggestions of rules. Here, user interface 700 may present a "Suggest" button 702 that indicate that proposed rules exist far one or more columns of the table 704, so that user can click the button 702 to view and accept rule suggestions, as opposed to or in conjunction with the user creating his or her own rules as depicted in FIG. 6.

Figure 8:
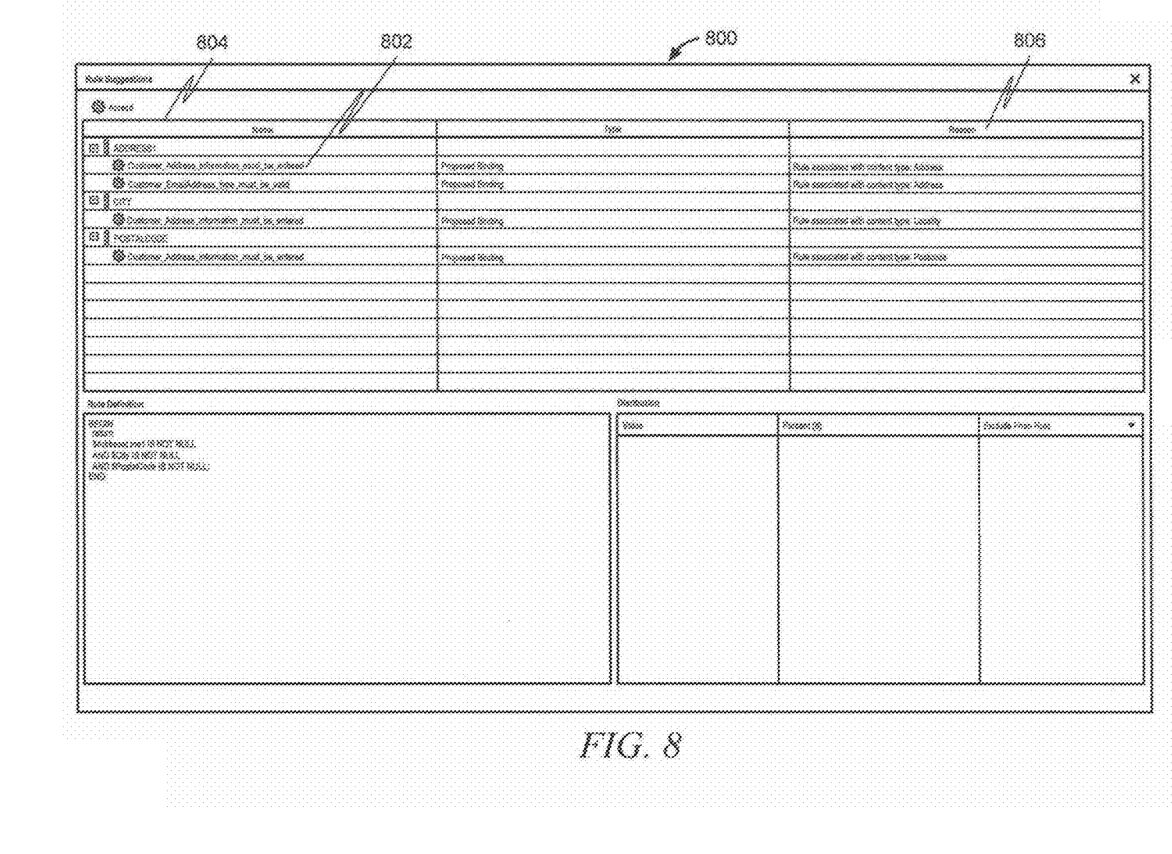
FIG. 8 is a screen capture illustrating another user interface, in accordance with an example embodiment, depicting automatically suggested rules.

FIG. 8 is a screen capture illustrating another user interface, in accordance with an example embodiment, depicting automatically suggested rules. Here, the user interface 800 presents rule suggestions 802. The user can Click "Accept" button 804 to accept one or more of the proposed bindings. Notably, a reason 806 for the suggestion of the rule may be presented. Often, this reason for suggestion 806 may be the content type associated with the rule.

Figure 9:
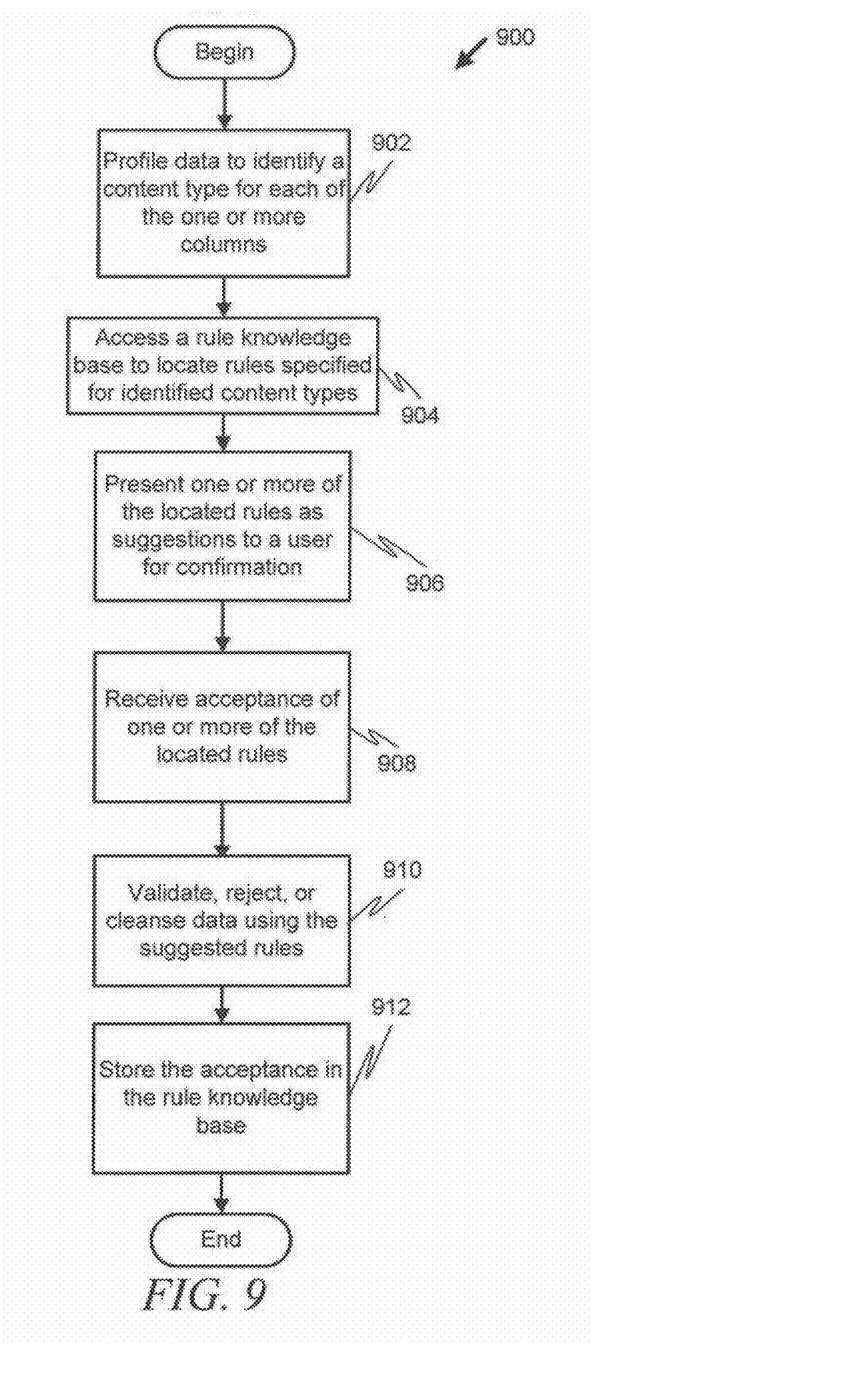
FIG. 9 is a flow diagram illustrating a process for automatic rule suggestion, in accordance with an example embodiment.

FIG. 9 is a flow diagram illustrating a process 900 for automatic rule suggestion, in accordance with an example embodiment. At 902, data is profiled to identify a content type for each of one or more columns in the data. This may involve traversing each of the columns and comparing various statistics and information about each column to a content type table that identifies content types based on statistics and information. For example, the content type table may indicate that if the column contains numerical information in the format XXX-XX-XXXX, then the content type for such a column is a social security number. Likewise, if the column contains numerical information with a length of five digits, the content type for such a column is a U.S. postal zip code. The profiling operation may therefore involve mapping the columns of the data to this content type, if possible.

At 904, a rule knowledge base is accessed to locate rules specified for identified content types. At 906, one or more of the located rules are presented as suggestions to a user for confirmation. At 908, the user accepts one or more of the suggested rules. At 910, data may be validated, rejected, or cleansed using the suggested rules. At 912, the acceptance of the one or more suggested rules is stored in the rule knowledge base, to be used in the future when locating rules based on identified content types.

Figure 10:
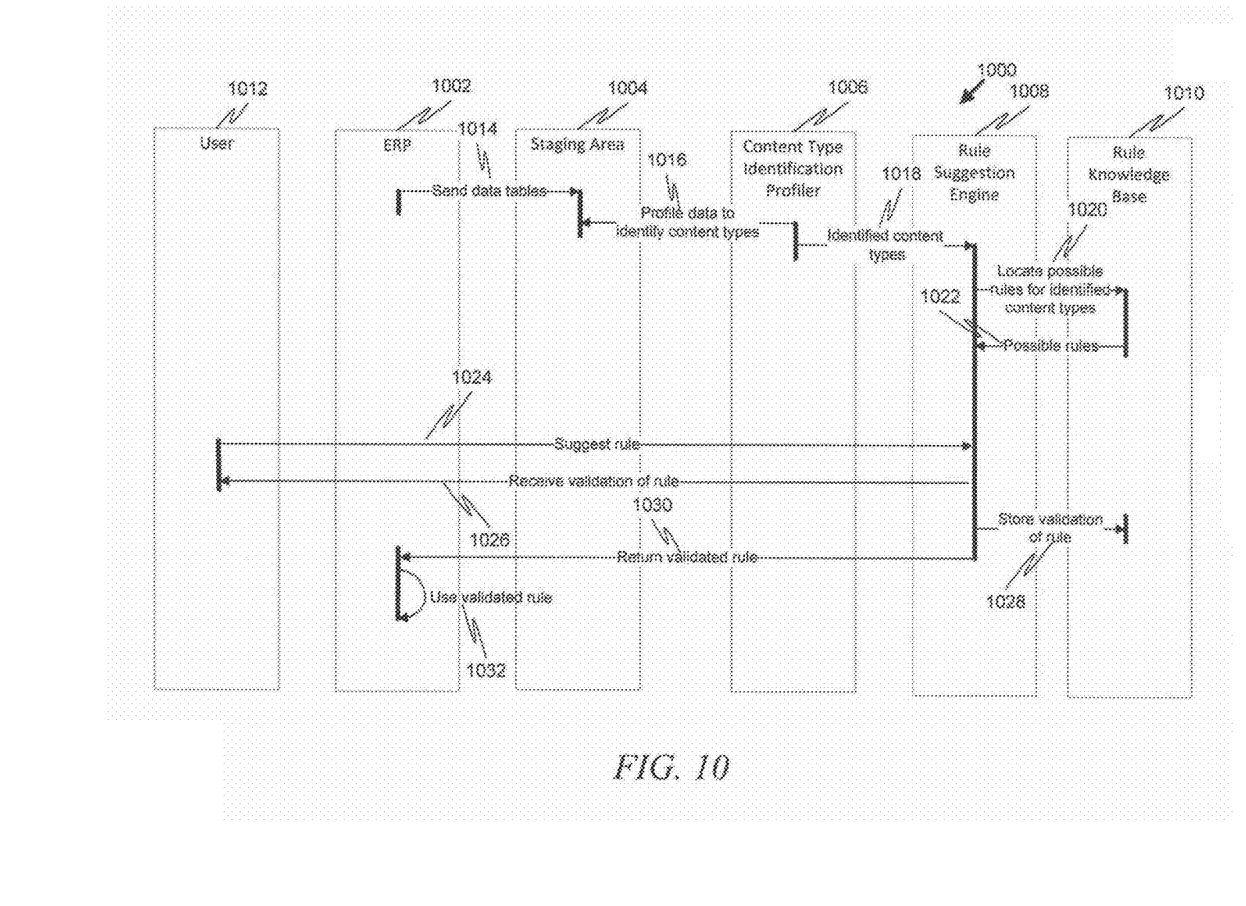
FIG. 10 is a sequence diagram illustrating a method of automatic rule generation, in accordance with an example embodiment.

FIG. 10 is a sequence diagram illustrating a method 1000 of automatic rule generation, in accordance with an example embodiment. There are six components depicted in this figure: ERP 1002, staging area 1004, content type identification profiler 1006, rule suggestion engine 1008, rule knowledge base 1010, and user 1012. While these are depicted as different components, one of ordinarily skill in the art will recognize that one or more of the components can be executed on the same hardware device. For example, the staging area 1004, content type identification profiler 1006, rule suggestion engine 1008, and rule knowledge base 1010 could all be run on a single computer platform.

At 1014, the ERP 1002 sends data tables to the staging area 1004. At 1016, the content type identification profiler 1006 profiles data in the staging area 1004 to identify content types corresponding to columns of the data. At 1018, the content type identification profiler 1006 sends the identified content types to a rule suggestion engine 1008. At 1020, the rule suggestion engine 1008 locates possible rules for identified content types, by accessing a rule knowledge base 1010. At 1022, these possible rules are returned by the rule knowledge base 1010.

This information may be used at 1024, to suggest a rule to the user 1012. At 1026, the user may accept a rule. At 1028, the acceptance (e.g., validation) of the rule may be stored in the rule knowledge base 1010. At 1030, the validated rule may be returned to the ERP so that it may be used at 1032. Use of the rule may involve, for example, applying the rule against currently stored data or applying the rule against incoming data.

In another example embodiment, the rules generated may not simply be validation rules; additional cleansing rules may also be generated. A cleansing rule is a rule that modifies incorrect data so that it is correct. In the example given above for country data in an employee record, the system may generate a rule to modify "USS" in the data to "USA."

It should be noted that while the above embodiments describe a process of recommending a rule as a column is added, the reverse can also be performed. Namely, the process may be modified to suggest a column as a rule is added.

Figure 11:
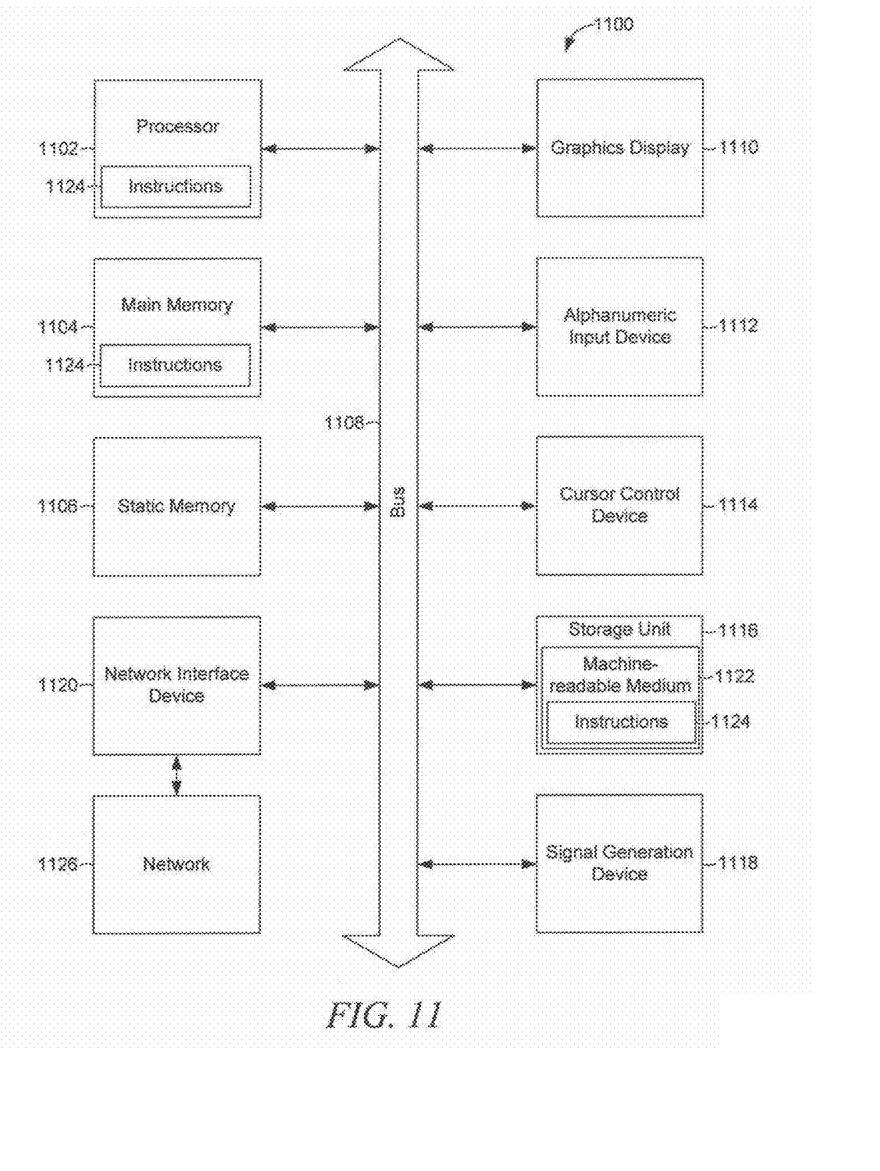
FIG. 11 is a block diagram of a computer processing system at a server system, within which a set of instructions, for causing the computer to perform any one or more of the methodologies discussed herein, may be executed.

FIG. 11 is a block diagram of a computer processing system at a server system, within which a set of instructions, for causing the computer to perform any one or more of the methodologies discussed herein, may be executed.

Embodiments may also, for example, be deployed by Software-as-a-Service (SaaS), application service provider (ASP), or utility computing providers, in addition to being sold or licensed via traditional channels. The computer may be a server computer, a personal computer (PC), a tablet PC, a set-top box (STB), a personal digital assistant (PDA), cellular telephone, or any processing device capable of executing a set of instructions (sequential or otherwise) that specify actions to be taken by that device. Further, while only a single computer is illustrated, the term "computer" shall also be taken to include any collection of computers that individually or jointly execute a set (or multiple sets) of instructions to perform any one or more of the methodologies discussed herein.

The example computer processing system 1100 includes processor 1102 (e.g., a central processing unit (CPU), a graphics processing unit (CPU) or both), main memory 1104 and static memory 1106, which communicate with each other via bus 1108. The processing system 1100 may further include graphics display unit 1110 (e.g., as plasma display, a liquid crystal display (LCD) or a cathode ray tube (CRT)). The processing system 1100 also includes alphanumeric input device 1112 (e.g., a keyboard), a cursor control device 1114 (e.g., a mouse, touch screen, or the like), a storage unit 1116, a signal generation device 1118 (e.g., a speaker), and a network interface device 1120.

The storage unit 1116 includes a machine-readable medium 1122 on which is stored one or more sets of instructions 1124 and data structures (e.g., software) embodying or utilized by any one or more of the methodologies or functions described herein. The instructions 1124 may also reside, completely or at least partially, within the main memory 1104 and/or within the processor 1102 during execution thereof by the processing system 1100, with the main memory 1104 and the processor 1102 also constituting machine-readable, tangible media.

The instructions 1124 may further be transmitted or received over network 1126 via a network interface device 1120 utilizing any one of a number of well-known transfer protocols (e.g., HTTP).

While the machine-readable medium 1122 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the computer and that cause the computer to perform any one or more of the methodologies of the present application, or that is capable of storing, encoding or carrying data structures utilized by or associated with such a set of instructions. The term "machine-readable medium" shall accordingly be taken to include, but not be limited to, solid-state memories, and optical and magnetic media.

While various implementations and exploitations are described, it will be understood that these embodiments are illustrative and that the scope of the claims is not limited to them. In general, techniques for maintaining consistency between data structures may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the claims.

While the embodiments are described with reference to various implementations and exploitations, it will be understood that these embodiments are illustrative, and that the scope of claims provided below is not limited to the embodiments described herein. In general, the techniques described herein may be implemented with facilities consistent with any hardware system or hardware systems defined herein. Many variations, modifications, additions, and improvements are possible.

The term "machine readable medium" is used generally to refer to media such as main memory, secondary memory, removable storage, hard disks, flash memory, disk drive memory, CD-ROM, and other forms of persistent memory. It should be noted that program storage devices, as may be used to describe storage devices containing executable computer code for operating various methods, shall not be construed to cover transitory subject matter, such as carrier waves or signals. Program storage devices and machine readable medium are terms used generally to refer to media such as main memory, secondary memory, removable storage disks, hard disk drives, and other tangible storage devices or components.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the claims and their equivalents.

What is claimed is:

1. A method of automatically suggesting rules for data stored in a table, the table comprising a plurality of columns, the method comprising:
    for each of one or more of the columns that do not have a content type explicitly provided in the table, identifying, using at least one hardware processor, a content type for the column by inferring the content type for the column based on an analysis of a format of data in the column and statistics generated by applying a function to data in the column, the content type being a meaning of data values stored in a particular column;
    accessing a rule knowledge database to locate rules specified for identified content types;
    generating a graphical user interface, the graphical user interface containing a series of rows and columns, each row of the graphical user interface corresponding to a different content type identified by or inferred for the table;
    rendering a selectable button in a first column of the graphical user interface;
    in response to detection of a user selection of the selectable button, rendering the suggested rules for the identified content types in the first column;
    receiving acceptance of one or more of the suggested rules from a user via the graphical user interface;
    applying accepted rules for data quality detection and monitoring;
    storing the received acceptance in the rule knowledge database; and
    applying the user acceptance knowledge in future rule suggestion.

2. The method of claim 1, wherein the accessing includes examining content type and rule relationships stored in the rule knowledge database and using the user acceptance history for rule suggestions in the identification of appropriate rules.

3. The method of claim 1, wherein the rules are data validation and cleansing rules.

4. The method of claim 1, wherein the table is located in an Enterprise Resource Planning (ERP) system.

5. The method of claim 1, further comprising:
    for a column whose identified content type does not yield any specified rules during the accessing, prompting the user to create a rule for the column and storing the created rule in the rule knowledge database.

6. The method of claim 1, wherein the rule knowledge database includes a data structure containing a plurality of content types and, for one or more of the plurality of content types, one or more rules specified for the one or more of the plurality of content types.

7. The method of claim 1, wherein each rule comprises a rule data structure identifying the rule and one or more rule parameter data structures, the rule data structure having a link to the one or more rule parameter data structures.

8. The method of claim 1, wherein the accessing includes running an auto rule suggestion agent to search for rules having the same content types as the identified content types for the columns.

9. The method of claim 1, wherein the presenting includes displaying to the user columns with identified column types associated with suggested rules.

10. The method of claim 1, herein the content type is an address content type.

11. A method of automatically suggesting columns within a table, the method comprising:
for each of one or more of the columns that do not have a content type explicitly provided in the table, identifying a content type for the column by inferring the content type for the column based on an analysis of a format of data in the column and statistics generated by applying a function to data in the column, the content type being a meaning of data values stored in a particular column;
accessing a rule knowledge database to locate content types specified for one or more identified rules;
generating a graphical user interface, the graphical user interface containing a series of rows and columns, each row of the graphical user interface corresponding to a different content type identified by or inferred for the table;
rendering a selectable button in a first column of the graphical user interface;
in response to detection of a user selection of the selectable button, rendering the suggested rules for the identified content types in the first column;
receiving acceptance of one or more of the suggested one or more columns from a user;
applying accepted rules for data quality detection and monitoring;
storing the received acceptance in the rule knowledge database; and
applying the user acceptance knowledge in future rule suggestion.

12. The method of claim 11, wherein the rules are data validation and cleansing rules.

13. An apparatus comprising:
a processor;
a volatile memory including a staging area, the staging area storing data stored in a table, the table comprising a plurality of columns;
a non-volatile memory including a rule knowledge database, the rule knowledge database including a data structure containing a plurality of content types and, for one or more of the plurality of content types, one or more rules specified for the one or more of the plurality of content types;
a content type identification profiler configured to, for each of one or more of the columns that do not have a content type explicitly provided in the table, identify a content type for the column by interring the content type for the column based on an analysis of a format of data in the column and generated by applying a function to statistics data in the column, the content type being a meaning of data values stored in a particular column;
a rule suggestion engine configured to access the rule knowledge database to locate rules specified for identified content types;
a graphical user interface configured to:
render a series of rows and columns, each row of the graphical user interface corresponding to a different content type identified by or inferred for the table;
render a selectable button in a first column of the graphical user interface;
in response to detection of a user selection of the selectable button, render the suggested rules for the identified content types in the first column;
receive acceptance of one or more of the suggested rules from a user; and
store the received acceptance in the rule knowledge database.

14. The apparatus of claim 13, wherein one or more of the validated rules are data validation rules.

15. The apparatus of claim 14, wherein the user interface is further configured to send the data validation rules to a component that detects and monitors input data based on the data validation rules.

16. The apparatus of claim 13, wherein one or more of the validated rules are cleansing rules.

17. The apparatus of claim 16, wherein the user interface is further configured to send the cleansing rules to a component that modifies the data based on the corrective rule.

18. The apparatus of claim 13, wherein the staging area is included within an Enterprise Information Management (EIM) tool.

19. The apparatus of claim 13, wherein the staging area is outside of an Enterprise Resource Planning (ERP) system.

20. An apparatus comprising:
a processor;
a volatile memory including a staging area, the staging area storing data stored in a table, the table comprising a plurality of columns;
a non-volatile memory including a rule knowledge database, the rule knowledge database including a data structure containing a plurality of content types and, for one or more of the plurality of content types, one or more rules specified for the one or more of the plurality of content types;
a content type identification profiler configured to, for each of one or more of the columns that do not have a content type explicitly provided in the table, identify a content type for the column by inferring the content type for the column based on an analysis of a format of data in the column and statistics about data in the column, the content type being a meaning of data values stored in a particular column;
a rule suggestion engine configured to access a rule knowledge database to locate rules specified for identified content types;
a graphical user interface configured to:
render a series of rows and columns, each row of the graphical user interface corresponding to a different content type identified by or inferred for the table;
render a selectable button in a first column of the graphical user interface;

in response to detection of a user selection of the selectable button, render the suggested rules for the identified content types in the first column;

receiving acceptance of one or more of the suggested one no more columns from a user;

applying accepted rules for data quality detection and monitoring;

storing the received validations in the rule knowledge database; and applying the user acceptance knowledge in future rule suggestion.

21. A non-transitory computer-readable storage medium comprising instructions that, when executed by at least one processor of a machine, cause the machine to perform operations of automatically suggesting rules for data stored in a table, the table comprising a plurality of columns, the method comprising:

for each of one or more of the columns that do not have a content type explicitly provided in the table, identifying a content type for the column by inferring the content type for the column based on an analysis of a format of data in the column and statistics generated by applying a function to data in the column, the content type being a meaning of data values stored in a particular column;

accessing a rule knowledge database to locate rules specified for identified content types;

generating a graphical user interface, the graphical user interface containing a series of rows and columns, each row of the graphical user interface corresponding to a different content type identified by or inferred for the table;

rendering a selectable button in a first column of the graphical user interface;

in response to detection of a user selection of the selectable button, rendering the suggested rules for the identified content types in the first column;

receiving acceptance of one or more of the suggested rules from a user via the graphical user interface;

applying accepted rules for data quality detection and monitoring;

storing the received acceptance in the rule knowledge database; and applying the user acceptance knowledge in future rule suggestion.

22. The non-transitory computer-readable storage medium of claim 21, wherein the profiling includes comparing each column of the table to a content type table, wherein the content type table correlates a plurality of content types to corresponding data statistics.

23. A non-transitory computer-readable storage medium comprising instructions that, when executed by at least one processor of a machine, cause the machine to perform operations of automatically suggesting columns within a table, the operations comprising:

for each of one or more of the columns that do not have a content type explicitly provided in the table, identifying a content type for the column by inferring the content type for the column based on an analysis of a format of data in the column and statistics generated by applying a function to data in the column, the content type being a meaning of data values stored in a particular column;

accessing a rule knowledge database to locate content types specified for one or more identified rules;

generating a graphical user interface, the graphical user interface containing a series of rows and columns, each row of the graphical user interface corresponding to a different content type identified by or inferred for the table;

rendering a selectable button in a first column of the graphical user interface;

in response to detection of a user selection of the selectable button, rendering the suggested rules for the identified content types in the first column;

receiving acceptance of one or more of the suggested one or more columns from a user;

applying accepted rules for data quality detection and monitoring;

storing the received acceptance in the rule knowledge database; and applying the user acceptance knowledge in future rule suggestion.

* * * * *